United States Patent
Prosperi

(10) Patent No.: US 7,363,522 B2
(45) Date of Patent: Apr. 22, 2008

(54) APPARATUS AND METHODS FOR INFORMATION HANDLING SYSTEM WITH POWER SUPPLY DEVICE WITH VARIABLE OUTPUT POWER

(75) Inventor: Roberto Prosperi, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 391 days.

(21) Appl. No.: 11/180,869

(22) Filed: Jul. 13, 2005

(65) Prior Publication Data

US 2007/0016806 A1     Jan. 18, 2007

(51) Int. Cl.
G06F 1/26 (2006.01)

(52) U.S. Cl. ............... 713/300; 713/340; 320/138; 320/140; 320/144; 320/150; 323/234; 323/245; 323/246

(58) Field of Classification Search ............... 713/300, 713/340; 320/138, 140, 144, 150
See application file for complete search history.

(56) References Cited

U.S. PATENT DOCUMENTS

| 4,670,703 | A | * | 6/1987 | Williams ............ 320/125 |
|---|---|---|---|---|
| 5,382,893 | A | | 1/1995 | Dehnel |
| 5,581,772 | A | | 12/1996 | Nanno et al. |
| 5,625,275 | A | | 4/1997 | Tanikawa et al. |
| 5,684,382 | A | * | 11/1997 | Fritz et al. ............ 320/164 |
| 5,698,964 | A | | 12/1997 | Kates et al. |
| 5,721,481 | A | * | 2/1998 | Narita et al. ............ 320/111 |
| 5,739,667 | A | * | 4/1998 | Matsuda et al. ............ 320/128 |
| 5,847,543 | A | * | 12/1998 | Carroll ............ 320/125 |
| 5,939,862 | A | | 8/1999 | Kates et al. |
| 6,058,034 | A | * | 5/2000 | Cummings et al. ............ 363/74 |
| 6,127,809 | A | | 10/2000 | Kates et al. |
| 6,172,891 | B1 | * | 1/2001 | O'Neal et al. ............ 363/146 |
| 6,300,744 | B1 | * | 10/2001 | Shum ............ 320/137 |
| 6,504,343 | B1 | * | 1/2003 | Chang ............ 320/124 |
| 6,587,799 | B2 | * | 7/2003 | Suzuki et al. ............ 702/63 |
| 6,888,338 | B1 | * | 5/2005 | Popescu-Stanesti et al. ..... 320/137 |
| 6,928,565 | B2 | * | 8/2005 | Watts et al. ............ 713/322 |
| 7,030,517 | B2 | * | 4/2006 | Hansmann et al. ......... 307/150 |

FOREIGN PATENT DOCUMENTS

JP              11109439 A    *    4/1999

* cited by examiner

*Primary Examiner*—Nitin C. Patel
(74) *Attorney, Agent, or Firm*—O'Keefe, Egan, Peterman & Enders LLP

(57) ABSTRACT

An information handling system includes a power source configured to provide a plurality of power levels to a load. At least one of the plurality of power levels corresponds to a level obtained by de-rating a capacity of the power source from a nominal design specification of the power source.

29 Claims, 3 Drawing Sheets

APPARATUS AND METHODS FOR INFORMATION HANDLING SYSTEM WITH POWER SUPPLY DEVICE WITH VARIABLE OUTPUT POWER

TECHNICAL FIELD

The inventive concepts relate generally to information handling apparatus and systems. More particularly, the invention concerns apparatus and associated methods for power sources or power supply devices, such as AC adapters, with variable output power.

BACKGROUND

As the value and use of information continues to increase, individuals and businesses seek additional ways to process and store information. One option available to users is information handling systems or apparatus. An information handling system or generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As the complexity and functionality of information handling systems and apparatus has grown, so has the specifications for devices or sources that supply power to them. In order to meet the specifications calling for higher power levels, conventional techniques rely on several approaches, such as selecting higher efficiency devices, increasing the size of the power source, using extra thermal spreader materials in the power source, using enhanced or extended surfaces to increase the heat rejection performance of the power source, active cooling, or a combination of the above. Each of those approaches, however, has disadvantages, such as increased cost, weight, size, etc.

SUMMARY

The disclosed novel concepts relate to power sources with variable output power levels or profiles in information handling systems or apparatus, such as notebook computers. In one embodiment, an information handling system includes a power source configured to provide a plurality of power levels to a load. At least one of the plurality of power levels corresponds to a level obtained by de-rating a capacity of the power source (e.g., thermal and/or electrical capacity) from a nominal design specification of the power source.

In another embodiment, a computer system includes an information handling apparatus and a power source coupled to the information handling apparatus. The power source is configured to have a plurality of power profiles. At least one profile in the plurality of profiles corresponds to using an unused thermal and/or electrical capacity of the power source.

In yet another embodiment, a system includes a notebook computer and a power source. The power source is coupled to the notebook computer. The power source is configured to provide a plurality of power levels to the notebook computer. At least one power level in the plurality of power levels is derived from unused thermal or electrical capacity of the power source.

BRIEF DESCRIPTION OF THE DRAWINGS

The appended drawings illustrate only exemplary embodiments of the invention and therefore should not be considered or construed as limiting its scope. Persons of ordinary skill in the art who have the benefit of the description of the invention appreciate that the disclosed inventive concepts lend themselves to other equally effective embodiments. In the drawings, the same numeral designators used in more than one drawing denote the same, similar, or equivalent functionality, components, or blocks.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
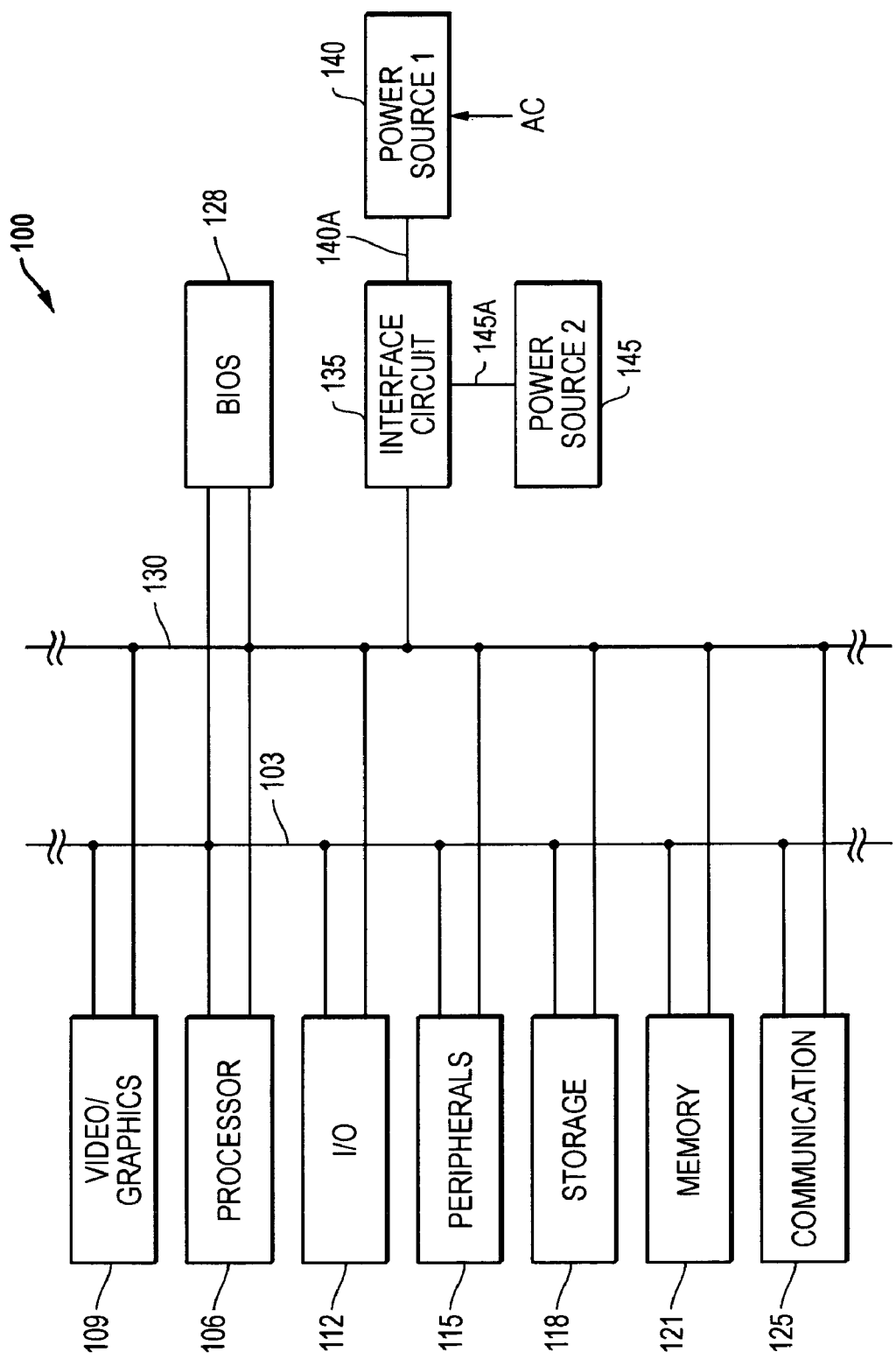
FIG. 1 shows a simplified block diagram of an information handling system according to an exemplary embodiment of the invention.

FIG. 1 shows a simplified block diagram of an information handling system 100 according to an exemplary embodiment of the invention. Generally speaking, system 100 may constitute a host or server computer system, workstation, and the like, as desired. System 100 includes one or more processors 106, one or more buses or communication media 103, video/graphics hardware 109, storage subsystem 118, memory 121, input/output (I/O) 112, peripherals 115, communication apparatus 125, and basic input output system (BIOS) 128.

Bus 103 provides a mechanism for the various components of system 100 to communication and couple with one another and thus acts as the backbone of the system. Processor 106, video/graphics 109, storage subsystem 118, memory 121, I/O 112, communications apparatus 125, BIOS 128, and peripherals 115 have the structure, and perform the functions, familiar to persons of ordinary skill in the art who have the benefit of the description of the invention.

System 100 also includes apparatus for supplying power to the information handling blocks and components and, generally, various parts of it. More specifically, system 100 includes power source 140, power source 145, and interface circuit 135. Power source 140 and power source 145 may constitute a wide variety of devices, as persons of ordinary skill in the art who have the benefit of the description of the invention understand. Interface circuit 135 allows one or both of power source 140 and power source 145 to supply power to various parts of system 100.

In some embodiments, for example, mobile information handling systems or apparatus, such as laptop or notebook computers, power source 140 may include an AC adapter, and power source 145 may include a battery. Power source 140 converts AC power, such as mains power, to regulated DC power. Power source 145 may be a rechargeable battery. Power source 140 (AC adapter) may charge the battery, as desired. The AC adapter may instead, or in addition, supply power to system 100 through interface 135.

Interface circuit 135 may include power switching and routing functions, control functions, and power regulation. For example, interface circuit 135 may couple power source 140 (AC adapter) to power source 145 (battery) in order to provide charge to it.

As another example, interface circuit 135 may couple power source 140 to both power source 145 (charge the battery) and simultaneously couple power source 140 to various parts of system 100 in order to supply power to them. Generally, interface circuit 135 may have other or additional functionality, as persons of ordinary skill in the art who have the benefit of the description of the invention understand.

Interface circuit 135 couples to various components or parts of system 100 through coupling mechanism 130. Coupling mechanism 130 provides a way of distributing power (e.g., one or more voltages) to various parts of system 100 (e.g., processor 106). Coupling mechanism 130 may include a set or conductors or wires, one or more bus bars, a power bus, etc., as persons of ordinary skill in the art who have the benefit of the description of the invention understand.

Note that FIG. 1 provides merely an illustrative and simplified block diagram or architecture of system 100. One may readily use alternative architectures or structures, and yet take advantage of the inventive concepts, by making modifications that fall within the knowledge of persons of ordinary skill in the art who have the benefit of the description of the invention.

Figure 2:
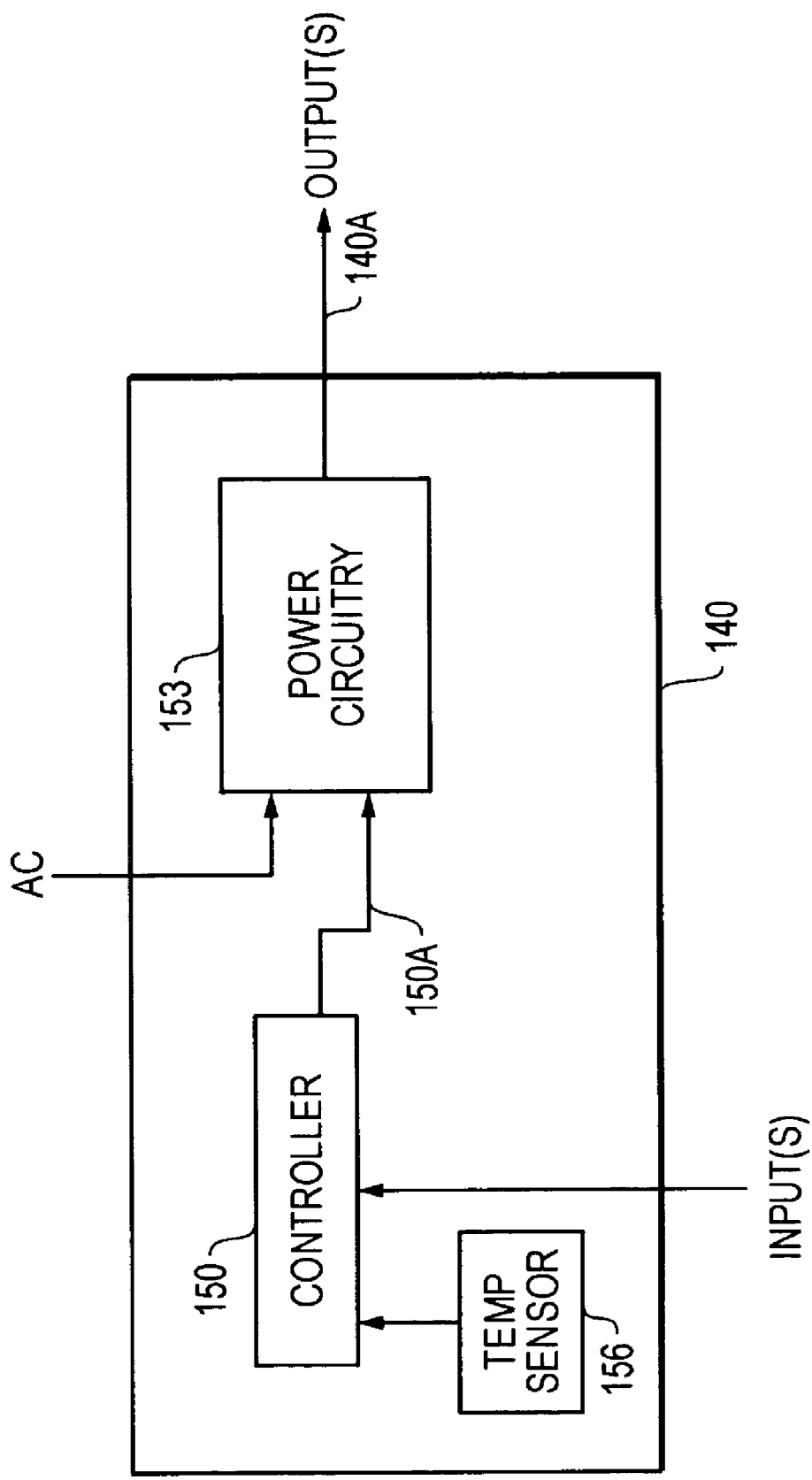
FIG. 2 illustrates a simplified block diagram of a power source according to an illustrative embodiment of the invention.

FIG. 2 shows a simplified block diagram of power source 140 according to an illustrative embodiment of the invention. Power source 140 includes controller 150 and power circuitry 153. Controller 150 couples to power circuitry 153 through signal link 150A.

In some embodiments, controller 150 may receive one or more input signals. The input signals may include signals from various parts of system 100, control signals, etc., as desired. The input signals may specify or control various functions of power source 140, as desired. Controller 150 provides signals to power circuitry 153 through signal link 150A. The signals may control the functions of power circuitry 153.

Power circuitry 153 provides the power conversion and/or power regulation functions of power source 140. Power circuitry 153 may include AC-DC converters, DC-DC converters, and the like, as desired, and as persons of ordinary skill in the art who have the benefit of the description of the invention understand.

Power source 140 has one or more outputs 140A. Power circuitry 153 may provide output power in the form of one or more voltages and/or one or more currents, as desired. In addition, power source 140 may provide one or more control, status, or information signals, as desired. In some embodiments, such signals may include a power supply identification (PSID) signal. Through the PSID signal, power source 140 may communicate various items of information, such as status of power source 140, to desired parts of system 100.

For example, one may use some of outputs 140A to provide information to other parts of the system, such as BIOS 128, about output rating of power source 140, and its functionality, such as battery charging rates, processor or CPU speed ratings, etc. The inventive concepts allow maintaining such functionality even in an environment where power source 140 is subject to change because of varying temperatures.

Power source 140 includes a temperature sensor 156. Temperature sensor 156 may monitor a variety of temperatures within power source 140. For example, one may locate sensor 156 so as to monitor the maximum temperature within power source 140 at any given time. That temperature may constitute the temperature of a device internal to power source 140, or it might correlate to an external surface temperature of power source 140, as desired. In addition, sensor 156 may provide for over-temperature sensing, shutdown functionality, and the like, as persons of ordinary skill in the art who have the benefit of the description of the invention understand.

Controller 150 receives one or more signals from sensor 156. The signals may indicate one or more temperatures, as described above. Controller 150 generates at least one signal derived from the signal(s) received from temperature sensor 156. Thus, the generated signal(s) may vary as a function of the temperature(s) sensed by sensor 156. Power source 140 may provide the generated signal(s) to various parts of system 100, as desired.

As noted above, modern information handling systems, such as notebook computers, can have relatively large power demands. To maintain relatively low cost and size of power sources, the inventive concepts contemplate a variety of approaches. Generally speaking, the inventive concepts take advantage of unused thermal and/or electrical capacity of power source 140 (AC adapter).

Put another way, the inventive concepts take advantage of the design margin built into typical AC adapters, i.e., the de-rating of the AC adapter used by many manufacturers and system integrators. The de-rating of the AC adapter causes less of the AC adapter's capacity to be used than the design specifications of the AC adapter provide.

In many cases, electronic apparatus, such as power sources or adapters, are designed thermally so that they remain within temperature specification at a worst-case ambient temperature, while simultaneously delivering the full steady-state rated power. Traditional ambient temperature design points in the electronics industry are typically 35° C. and 40° C.(95° F. and 104° F., respectively). In many practical situations, however, the user environment may seldom exceed 25° C.(77° F.) ambient temperature. Thus, in a significant number of cases, about 15° C. of unused temperature margin in the adapter exists.

Furthermore, many practical situations demand full or specified power for limited periods of time. At other times, the power drawn by the equipment is a nominal value, less than the peak or full value. Because AC adapters typically have a relatively large thermal capacitance, they can support (thermally) a significantly higher transient power demand than they can on a steady-state basis.

By taking advantage of the unused thermal margin and the peak power assumptions designed into typical AC adapters, the inventive concepts seek to reduce the cost and/or size of the AC adapters used in information handling systems. In some embodiments, power source 140 includes an AC adapter that supports two or more output power ratings or steps.

Put another way, the AC adapter may have two or more power profiles (e.g., voltage, current, and/or power levels). The AC adapter may use a specific profile depending on a number of factors, such as the desired or demanded load level, temperature levels, circuit characteristics and parameters, etc., as desired. This arrangement allows the adapter, in many real-life situations, to deliver a higher output power than it would be able to deliver had it been designed to deliver a worst-case, single, steady-state output at, say, 40° C. ambient temperature.

As an example, one may use a 150-watt adapter supplied by Dell, Inc., to thermally support an output level of approximately 28% higher power (about 195 watts) without increasing the form factor of the adapter. As an alternative, one may use the inventive concepts to enable the use of a smaller adapter. For example, a 90-watt adapter, supplied by Dell, Inc., might fit within the thermal envelope of the smaller 65-watt adapter.

Figure 3:
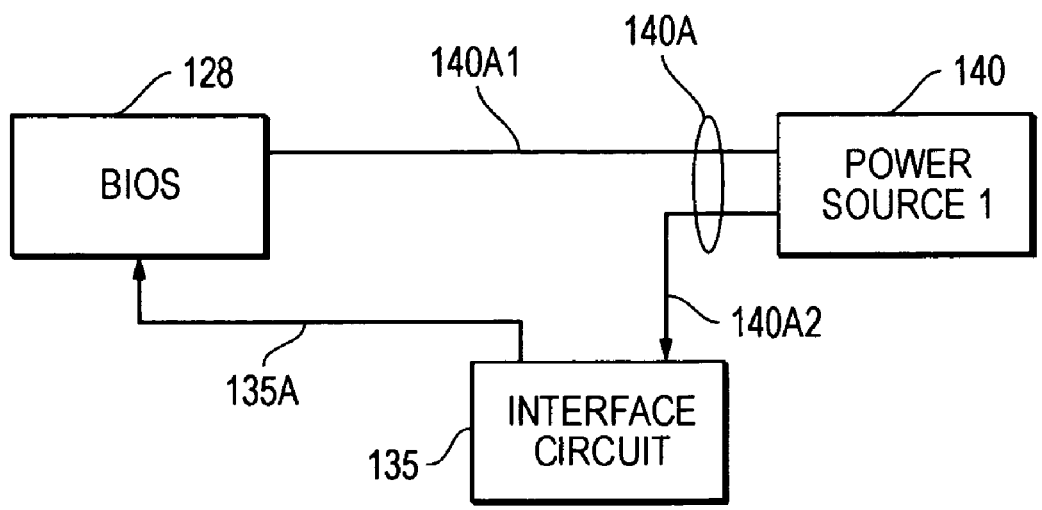
FIG. 3 depicts a simplified block diagram of a part of an information handling system according to an illustrative embodiment that includes a power communication protocol.

As noted, some information handling systems, such as notebook computers, communicate with the AC adapter (power source 140). FIG. 3 shows a simplified block diagram of a part of an information handling system according to an illustrative embodiment that includes a power communication protocol. More specifically, power source 140, an AC adapter, provides output signals 140A. Output signals 140A may include voltage(s) and/or current(s) 140A2 delivered to various parts of system 100 via interface circuit 135, as described above.

In addition, output signals 140A include signal(s) 140A1. Signal(s) 140A1 allow communication between parts of system 100, such as BIOS 128, and the AC adapter. Through signal(s) 140A1, the AC adapter can provide information about its internal conditions, or even external conditions, such as temperature, as described above. In response, one or more parts or blocks of system 100 take various actions, such as controlling or changing power functions, based on the values of signal(s) 140A1.

In one illustrative implementation, signal 140A1 constitute the PSID signal, reported to a notebook computer. The PSID signal may be provided to desired parts or blocks, such as BIOS 128. At low temperatures of power source 140, the PSID signal may report to the notebook computer that a given level of power, say, 150 watts, is available. BIOS 128 may then cause the notebook to operate in such a manner so as to make use of the available power (150 watts). In such a mode, the battery may be charged relatively fast, the CPU and graphics may be operated in relatively high performance modes, etc.

Suppose, however, that a temperature monitored by sensor 156 rises, and exceeds a threshold (pre-determined or configured dynamically). Under those circumstances, power source 140 may use the PSID signal to report a lower power level, say, 90 watts. In such a situation, the notebook computer may operate in lower power mode (e.g., reduced performance of one or more components or blocks) until such a time that the adapter temperature returns to a lower level (e.g., below the threshold).

To facilitate communication between the notebook computer and the AC adapter, BIOS 128 may be configured to periodically poll the PSID signal. Such a scheme presents relatively little overhead, and helps to ensure that the system operates in a mode compatible with the most recent value or setting of the PSID signal.

As an alternative, the AC adapter (power source 140) may cause the notebook to poll the PSID signal. The AC adapter may do so in a number of ways, for example, by causing controller 150 to control power circuitry 153 such that it drops below a threshold one or more output levels (e.g., voltage, current) supplied to the notebook. The threshold may have a level that causes the notebook to look for the presence of power source 140 when the output level(s) falls below the threshold.

Figure 4:
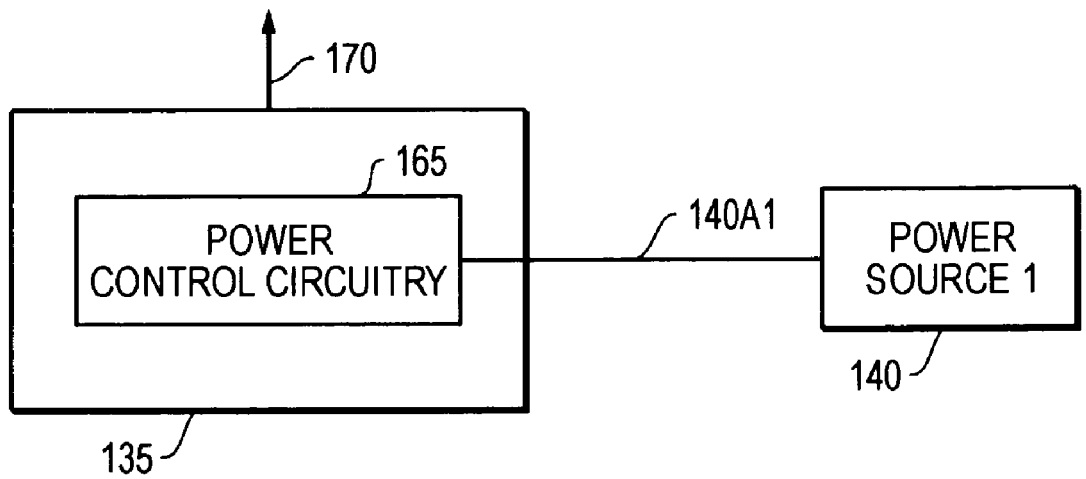
FIG. 4 shows a simplified block diagram of a part of another information handling system according to an illustrative embodiment that includes a power communication protocol.

Rather than communicating with BIOS 128, power source 140 may communicate with other parts of system 100, as desired. FIG. 4 shows a simplified block diagram for communication between power source 140 and interface circuit 135 so as to facilitate the power functionality of system 100.

More specifically, power source 140 may provide signal (s) 140A1 to interface circuit 135. Interface circuit 135 may include power control circuitry 165. In response to signal(s) 140A1 (e.g., PSID), power control circuitry 165 may provide one or more control signals 170 to the various blocks/parts of system 100. For example, control signals 170 may change the functionality and/or operation of one or more blocks or circuits in system 100, such as processor 106, video/graphics 109, storage 118, etc.

Generally speaking, the notebook may alter its power consumption profile depending on the information it receives from power source 140. The notebook may use software or firmware in combination with hardware, as desired. This arrangement may use look-up tables, algorithms, etc., to determine the functionality and power consumption characteristics of one or more blocks, circuits, or parts of system 100 depending at least in part on the information received from power source 140 (e.g., information from temperature sensor 156).

Note that the above protocols and signals merely help to describe illustrative embodiments of the invention. Rather than using signals such as PSID, one may use a wide variety of communication protocols, signals, and schemes, as desired, and as persons of ordinary skill in the art who have the benefit of the description of the invention understand.

Referring to the figures, persons of ordinary skill in the art will note that the various blocks shown may depict mainly the conceptual functions and signal flow. The actual circuit implementation may or may not contain separately identifiable hardware for the various functional blocks and may or may not use the particular circuitry shown. For example, one may combine the functionality of various blocks into one circuit block, as desired. Furthermore, one may realize the functionality of a single block in several circuit blocks, as desired. The choice of circuit implementation depends on various factors, such as particular design and performance specifications for a given implementation, as persons of ordinary skill in the art who have the benefit of the description of the invention understand. Other modifications and alternative embodiments of the invention in addition to those described here will be apparent to persons of ordinary skill in the art who have the benefit of the description of the invention. Accordingly, this description teaches those skilled in the art the manner of carrying out the invention and are to be construed as illustrative only.

The forms of the invention shown and described should be taken as the presently preferred or illustrative embodiments. Persons skilled in the art may make various changes in the shape, size and arrangement of parts without departing from the scope of the invention described in this document. For example, persons skilled in the art may substitute equivalent elements for the elements illustrated and described here. Moreover, persons skilled in the art who have the benefit of this description of the invention may use certain features of the invention independently of the use of other features, without departing from the scope of the invention.

The invention claimed is:

1. An information handling system, comprising a power source configured to provide a plurality of power levels to a load, said power source having a rated power level selected such that said power source remains below a first power source temperature when delivering said rated power level at steady state and at a first ambient temperature; wherein at least one of the plurality of power levels corresponds to a second power level of said power source that is higher than said rated power level; wherein said power source is configured to provide said rated power level at steady state to said load at said first ambient temperature; and wherein said power source is configured to provide said second higher power level to said load only under one or more of the following conditions: said power source is providing power at a second ambient temperature that is lower than said first ambient temperature, said power source is providing power transiently to said load, or a combination thereof.

2. The information handling system according to claim 1, comprising a notebook computer.

3. The information handling system according to claim 2, wherein said power source comprises an AC adapter.

4. The information handling system according to claim 1, wherein one of the plurality of power levels corresponds to a peak power level of the AC adapter.

5. The information handling system according to claim 1, wherein at least one of the plurality of the power levels depends on a temperature of said power source as it provides power to said load.

6. The information handling system according to claim 5, further comprising a basic input/output system (BIOS), wherein the BIOS is configured to receive a signal corresponding to the temperature of the power source.

7. The information handling system according to claim 6, wherein the BIOS is further configured to modify a power consumption characteristic of at least one circuit in the information handling system.

8. The information handling system according to claim 7, wherein the BIOS is configured to modify the power consumption characteristic of the at least one circuit in the information handling system based on the temperature of the power source.

9. The information handling system according to claim 6, wherein the signal corresponding to the temperature of the power source comprises a power supply identification (PSID) signal.

10. The information handling system according to claim 5, wherein said power source is an AC Adapter.

11. A computer system, comprising:
an information handling apparatus; and
a power source coupled to the information handling apparatus;
wherein the power source is configured to have a plurality of power profiles, and
wherein at least one profile in the plurality of profiles corresponds to using an unused thermal capacity of said power source; and
wherein said power source is configured to select said at least one profile in the plurality of profiles corresponding to using an unused thermal capacity of the power source based on a sensed temperature of said power source.

12. The computer system according to claim 11, wherein at least one profile in the plurality of profiles of said power source corresponds to a reduced power consumption of at least one circuit in the information handling apparatus.

13. The computer system according to claim 12, wherein said power source comprises an AC adapter.

14. The computer system according to claim 13, further comprising a battery coupled to the AC adapter.

15. The computer system according to claim 14, wherein at least one profile in the plurality of profiles of said power source corresponds to a reduced charging rate of the battery.

16. A system, comprising:
a notebook computer; and
a power source coupled to the notebook computer,
wherein said power source is configured to select and provide a plurality of power levels to the notebook computer, wherein at least one power level in the plurality of power levels is a rated power level selected such that said power source remains below a first power source temperature when delivering said rated power level at steady state and at a first ambient temperature, and wherein at least one other power level in the plurality of power levels is selected and derived from unused thermal or electrical capacity of said power source under at least one of the following conditions: when said power source is providing power at a second ambient temperature that is lower than said first ambient temperature, when said power source is providing power transiently to said load, or a combination thereof.

17. The system according to claim 16, wherein said power source is further configured to provide a control, status or information signal about the power source to the notebook computer.

18. The system according to claim 17, wherein the information is derived from a temperature of said power source as it provides power to said load.

19. The system according to claim 17, wherein the notebook computer polls said power source, and wherein, in response, said power source provides a control, status or information signal about said power source to the notebook computer.

20. The system according to claim 19, wherein said power source causes the notebook computer to poll said power source, and wherein, in response, said power source provides a control, status or information signal about the power source to the notebook computer.

21. The system according to claim 19, wherein, based on the control, status or information signal received from said power source, a power consumption characteristic of at least one circuit in the notebook computer is changed.

22. The system according to claim 18, wherein said power source is an AC Adapter.

23. The system according to claim 22, wherein said power source is further configured to provide a control, status or information signal about said power source to the notebook computer while said power source is providing power; and wherein based on the control, status or information signal received from said power source, a power consumption characteristic of at least one circuit in said notebook computer is changed while said power source is providing power.

24. An information handling system, comprising a power source configured to provide a plurality of power levels to a load, wherein at least one of the plurality of power levels corresponds to a level obtained by de-rating a capacity of said power source from a nominal design specification of said power source; and wherein at least one of the plurality of the power levels depends on a monitored temperature of the power source while it is providing said power to said load.

25. The information handling system of claim 24, wherein said power source is an AC Adapter.

26. An information handling system, comprising a power source configured to provide a plurality of power levels to a load, wherein at least one of the plurality of power levels corresponds to a level obtained by de-rating a capacity of the power source from a nominal design specification of the power source, and wherein at least one of the plurality of the power levels depends on a temperature of the power source; and a basic input/output system (BIOS), wherein the BIOS is configured to receive a signal corresponding to the temperature of the power source.

27. The information handling system according to claim 26, wherein the BIOS is further configured to modify a power consumption characteristic of at least one circuit in the information handling system.

28. The information handling system according to claim 27, wherein the BIOS is configured to modify the power consumption characteristic of the at least one circuit in the information handling system based on the temperature of the power source.

29. The information handling system according to claim 26, wherein the signal corresponding to the temperature of the power source comprises a power supply identification (PSID) signal.

* * * * *